United States Patent
Krishnaprasad et al.

(10) Patent No.: US 11,599,585 B2
(45) Date of Patent: Mar. 7, 2023

(54) COOKIELESS DELIVERY OF PERSONALIZED CONTENT

(71) Applicant: salesforce.com, inc., San Francisco, CA (US)

(72) Inventors: Muralidhar Krishnaprasad, Seattle, WA (US); Kristen Chapman, Hopedale, MA (US)

(73) Assignee: Salesforce, Inc., San Francisco, CA (US)

( * ) Notice: Subject to any disclaimer, the term of this patent is extended or adjusted under 35 U.S.C. 154(b) by 427 days.

(21) Appl. No.: 16/885,695

(22) Filed: May 28, 2020

(65) Prior Publication Data
US 2021/0374192 A1  Dec. 2, 2021

(51) Int. Cl.
*G06F 16/957* (2019.01)
*G06F 16/9535* (2019.01)
*G06F 16/951* (2019.01)
*G06F 16/901* (2019.01)

(52) U.S. Cl.
CPC ........ *G06F 16/951* (2019.01); *G06F 16/9024* (2019.01); *G06F 16/9535* (2019.01); *G06F 16/9574* (2019.01)

(58) Field of Classification Search
CPC .. G06F 16/951; G06F 16/953; G06F 16/9532; G06F 16/9538; G06F 16/9024; G06F 16/9535; G06F 16/9536; G06F 16/9574
See application file for complete search history.

(56) References Cited

U.S. PATENT DOCUMENTS

| | | | | |
|---|---|---|---|---|
| 10,733,246 B2* | 8/2020 | Marcella | ............ | G06F 16/9535 |
| 2005/0210135 A1* | 9/2005 | Abrahams | ............... | H04L 63/08 |
| | | | | 709/229 |
| 2005/0235155 A1* | 10/2005 | Lopatin | ................ | H04L 67/564 |
| | | | | 713/182 |
| 2006/0095538 A1* | 5/2006 | Rehman | ................ | H04L 67/02 |
| | | | | 709/217 |
| 2019/0332805 A1* | 10/2019 | Tola | .................... | G06F 16/9566 |

* cited by examiner

*Primary Examiner* — Kris E Mackes
(74) *Attorney, Agent, or Firm* — Butzel Long; Donald J. Lecher

(57) ABSTRACT

A computer-implemented method of providing targeted content to a user includes generating a query index from a data corpus, the query index including a plurality of market segment-based queries, wherein each market segment-based query of the plurality of queries is configured to provide targeted content on a browser user interface of a user determined to be within a corresponding market segment. The method further includes constructing the browser-executable library including the query index, where the browser-executable library is configured to execute within a local machine browser of the user, and transmitting the browser-executable library to the local machine browser of the user, wherein the browser-executable library is configured to determine that a query of the plurality of market segment-based queries matches user-specific data only stored in the local machine browser of the user, where the query matching the user-specific data stored in the local machine browser of the user is configured to cause the local machine browser to request the targeted content corresponding to the user-specific data.

20 Claims, 7 Drawing Sheets

COOKIELESS DELIVERY OF PERSONALIZED CONTENT

BACKGROUND

With the advent of privacy restrictions, traditional methods of on-line user data collection and corresponding user-personalized content production are dramatically changing. The traditional way involves gathering data about users, their behavior via cookies, i.e., first party (1P) cookies, (cookies created by the domain a web user is visiting), and third party (3P) cookies, (cookies created by domains other than the one the user is visiting at the time, and are mainly used for tracking and online-advertising purposes), segmenting the audience and then targeting the channels. Web browser providers are embarking on initiatives to stop user data leaking into the backend. This started off with identifying 3P cookies but will soon expand to stopping 1P tracking cookies as well.

Generally, cookies are small text files placed on user devices after they visit a website. The information cookies contain is then accessed by servers on the visited site. The data cookies carry makes it possible to identify and recognize users later. The only threat cookies may pose relates to user privacy, if the cookies are employed for illicit purposes.

Typically, cookies are used for many different reasons, for example: session management for logins, shopping carts, game scores; user privacy controls & settings; user profiling, segmentation, optimization; analytics, attribution, verification; mapping users across platforms; ads frequency capping; and targeting & retargeting. The use of cookies has a large effect on user experience by making web browsing more convenient and personalized.

1P cookies are issued by a website that a user navigates to and views directly. When a user loads a website in a browser, for example, foo.com, then this site creates a cookie which is then saved in the browser data of the user's computer. Third-party ("3P") cookies are not created by the website being visited, but rather by another entity. For example, if a user accesses a page at foo.com, and the page includes a video hosted at video-hosting site example.com, the video hosting site example.com may set a cookie which is then saved in the browser data of the user's computer.

In such a situation the website owner, foo.com, may embed a piece of code and a video provided by example.com on the relevant foo.com page. When the video hosting site code is executed in the user's browser, or the video is loaded, example.com may track the video player and put data in cookies stored on the user's browser data. The cookie is therefore classified as a third-party cookie being created by a domain other than foo.com.

3P cookies may be used heavily in online advertising where advertisers or web service advertising entities that service retail clients add their 3P tags to a page that may display ads, as well as track users and user devices across different sites users visit.

However, the advent of data privacy features in browsers such as Safari's Intelligent Tracking Prevention (ITP) have incorporated methods to assess which privately controlled domains may track users across different websites. ITP utilizes a machine-learning model, (known as the Machine Learning Classifier), which is fed statistics collected by a users' Safari browser, and when the Machine Learning Classifier identifies that a particular 1P cookie could potentially be used for tracking, the 1P cookie will be blocked. These actions impact the advertiser's ability to provide reporting, affiliate marketing and attribution techniques such that websites may no longer leave cookies in the user's browser for later retargeting and attribution purposes. This impacts companies that access their 1P cookies in a third-party context, and as a result, compromises reporting capability and accuracy.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

As previously described, it may be desirable to perform tracking a user's browsing history for many purposes, one of which may be to provide directed or personalized media content, for example, advertising content, to a user in a privacy-compliant manner. Embodiments disclosed herein provides systems and techniques that allow for useful functionality, such as relevant or personalized media content, user preference retention, and the like, which occur within such privacy-compliant contexts. For example, one method presented herein includes sending web-browser executable instructions to a local machine of a user that includes a prioritized query index, the queries in the query index may be run against privacy-protected user data and user-attribute data to determine any matching user data to the search criteria of a query. When a query identifies a match to any of the user data, the browser-executable instructions may request an external personalized content provider or a media content provider to send personalized content or media content, respectively, to the local machine browser based on the matching user data.

Figure 1:
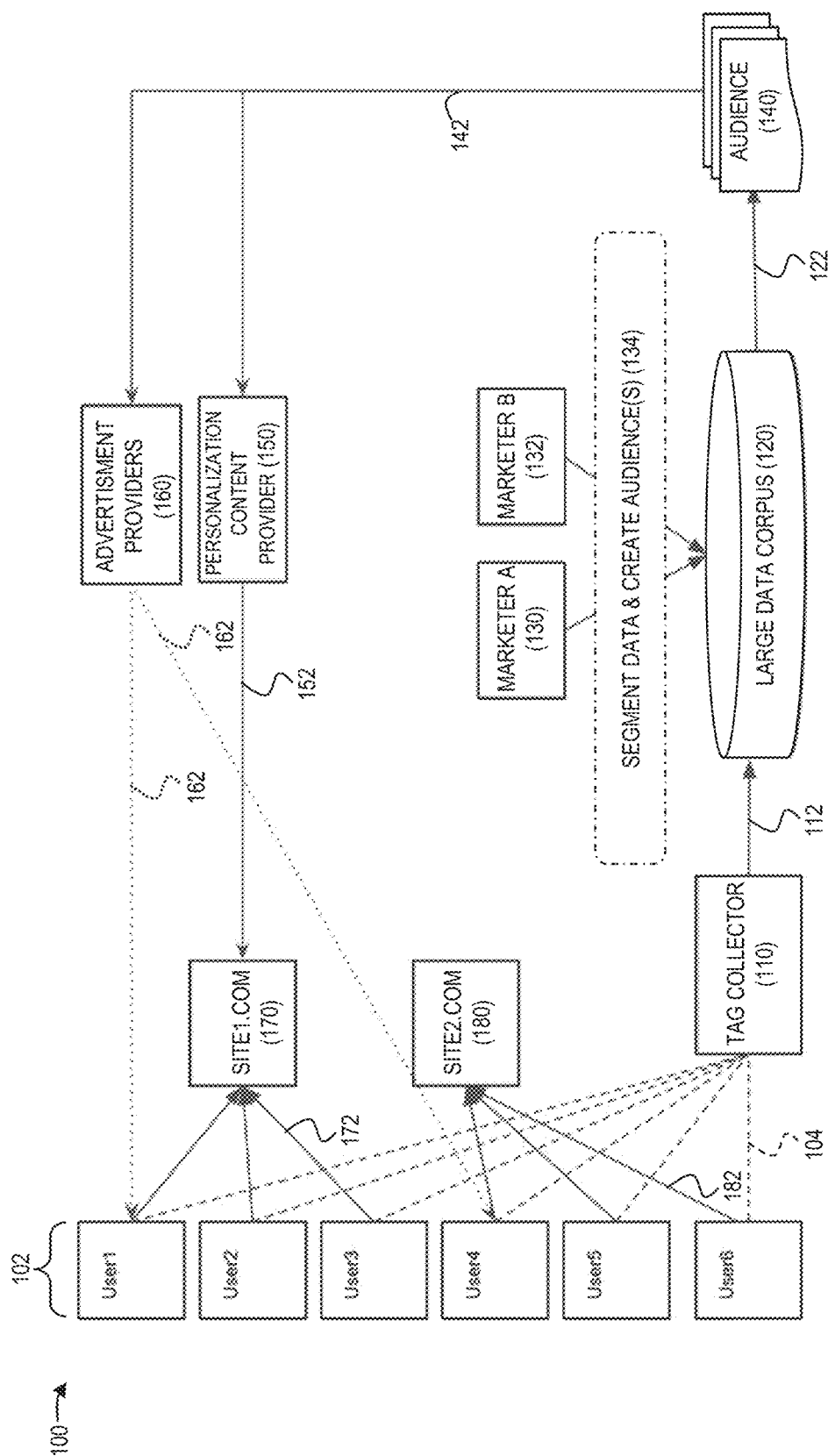
FIG. 1 illustrates an example of a model that tracking multiple user sources of on-line user behavior.

FIG. 1 illustrates an example of a model 100 for tracking multiple user sources 102 of on-line user behavior, i.e., typically user-specific data 104, to generate targeted user-personalized content production provided either directly to the users via a media content provider(s) 160, or through a personalization content provider 150 for delivery and display to a website, e.g., "SITE1.COM" 170.

The model 100 includes receiving user-specific data 104 from various sources, for example, users 1-6, 102, via tags 104 at a tag collector 110, wherein the tags 104 are generated by users visiting 172, 182 a website, 170 and 180, respectively. Typically, the identification of users is provided by either 1P or 3P cookies. This user-specific data is typically collected 112 into large data corpus warehouse repositories 120. The collected user data in the data corpus 120 is used by marketing entities, e.g., marketer A 130 and marketer B 132, who segment and identify users from the collected user data in the data corpus 120 to produce 122 specific user attribute-based audiences 140.

These attribute-based audiences are provided to a personalization content provider 150 to provide personalized content 152 to websites, e.g., "SITE1.COM" 170, to be displayed when a user from the user sources 102 is determined to be a member of a particular audience 140. The attribute-based audiences are further provided to media content providers 160 to provide targeted media 162 to users from the user sources 102 who are determined to be a member of a particular audience 140, for example in FIG. 1, User1 and User 4.

However, the technique of FIG. 1 may not be viable, or may be undesirably inefficient, given the shift in the web browser provider industry by adopting the ITP practices and protocols.

Web browser providers to limit user data stored on a user's local machine browser in their browsers. Thus, content providers may not be able to track or receive user behavior outside of the user's browsers. Web browser providers may instead allow browser-executable code to be executed in their browsers to run routines to determine if a user matches a certain set of well-defined behaviors, e.g., the gender of the user, or the user visits a particular website, etc.

In the data processing world, a traditional way of processing data may be to bring data to tables, curate and index the tables, and run queries against the data in the table. When there are many queries, the data may be optimized, and each query may be run on top of the optimized data to get results for each query. This works well when all the data is accounted for and when new queries are received.

In situations when data is received, for example, in an event, but there is no large data corpus available to optimize, that is, when there is a known query but the data may not be present, Query Indexing/Streaming provides a solution by assembling all the known queries into a query model, so that when a new data arrives, a query may be quickly determined to match the incoming data based on the query model and rules may be fired accordingly.

A representative solution provided herein instead pushes a query to a client. A Data Management Platform (DMP)/Customer Data Platform (CDP) system may no longer merely collect data, but instead function as a query indexing engine. CDPs typically may be used for creating personalized customer experiences by collecting and tying together customer data through personally identifiable information (PII)—like email addresses and phone numbers—to create a 360-degree view of the customer. The primary data source for CDPs is first-party data from customers who have directly interacted with the business online (through website interactions, campaign engagement, online purchases, and loyalty programs) as well as offline (through in-store purchases, in-person events). CDPs may also be able to use second-party data (sourced from businesses that collect and sell first-party data) and third-party data (collected through anonymous identifiers like cookies) in addition to first-party data. DMPs typically collect primarily anonymous data to profile, analyze, and target online customers; these platforms help digital marketers make more informed media buying decisions and more effectively target campaigns. Digital marketing agencies and in-house marketing teams use DMPs to identify audiences by categories like demographic, behavior, or location to better target digital media content campaigns. DMPs aggregate high volumes of anonymous customer data originating from multiple sources. The primary data sources for DMPs are second- and third-party data. DMPs must work with anonymous entities like cookies, devices, and IP addresses to exchange information about audiences while protecting personal privacy.

Figure 2:
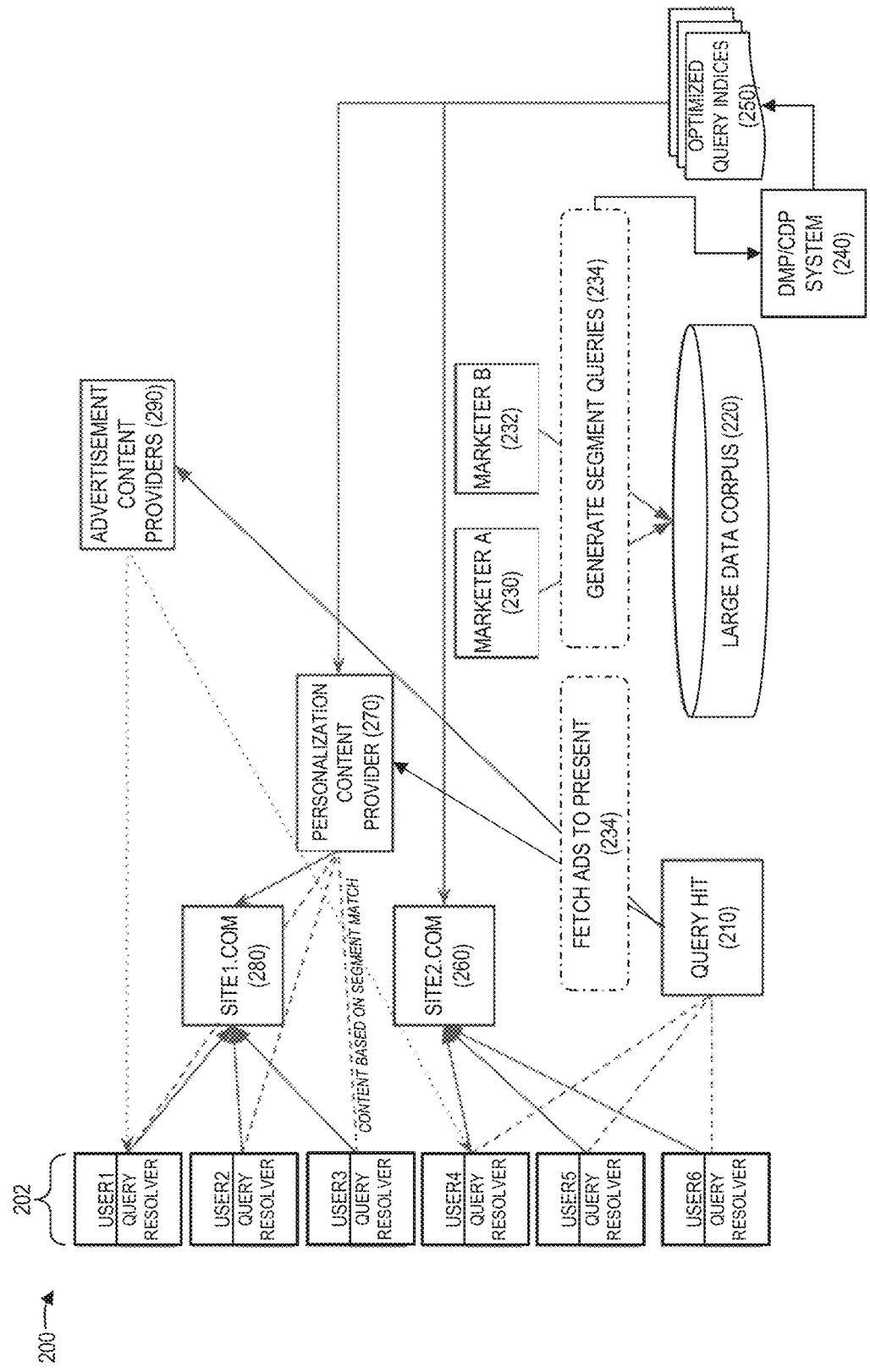
FIG. 2 illustrates an example of method that enables user-specific targeting content to be delivered to user browsers without using cookies according to an implementation of the disclosed subject matter.

In FIG. 2, for example, media content providers, represented by marketer A 230 and marketer B 232, may generate segment-based queries 234 with respect to user data stored in the large data corpus 220, where the segment-based queries are directed toward particular market segments of users the marketers 230, 232 intend to provided targeted media content. For example, media content providers may create the following queries: a.) target all male customers, living in Seattle, Wash., greater than 40 years of age; and b.) target all female customers, living in San Francisco, Calif., who frequently visit on-line shopping sites.

A DMP/CDP system 240 may assemble each query into a prioritized decision tree graph query index that may then be constructed into a browser-executable library that may be sent to any browsers 202 via websites, for example 260 and a personalization content provider 270. The prioritized decision tree graph queries may include libraries of queries, or sub-collections of queries pushed down to local browsers. Alternatively, the browser-executable library may be constructed by compiling the query index with other browser-executable instructions into the browser-executable library.

The assembled query indices may be stored in a query indices repository 250 for subsequent transmission to user local machine browsers. A query resolver executing by means of the received browser-executable library in the local machine browser may then validate which query(ies) in the executable library query index match user data stored in the user's web browser. When a match or query hit 210 is detected, the browser fires an appropriate call to either the personalize content provider 270 to media content providers 290 to send corresponding content to the content requesting browser.

Thus, the media content marketers 230, 232 prioritize market segment queries based upon a data set from the data corpus 220 by the DMP/CDP system 240 performing query optimization of a prioritized market segment set of queries to create a query index. The entire set, or a subset of the decision tree graph query (based on size), is sent to a user browser via the personalization content provider 270 or via a website (e.g., "SITE2.com" 260).

When the user's browser 202 loads the website, for example, SITE2.com 260, the browser-executable library in the webpage uses the decision tree graph query to determine which of the executable library queries may match the user's behavior stored in the browser as user-specific data. When a query hit 210 is determined, the browser 202 may call back to the personalization content provider 270 to retrieve for display in the user's browser 312 appropriate personalized content. In the alternative, when a query hit 210 is determined, the browser 202 may in addition make a call to a a media content provider 290 which may retrieve and send an appropriate media content for display on the user's browser 202.

The methods presented herein may be directed toward pushing to a local user's browser: 1) a browser-executable library that causes the browser to locally process a query transmitted with the browser-executable library and extract data from the user's browser related to user attribute data and the user's browser activity, both in a current browser session and previous browser sessions, wherein the browser-executable library causes the user-extracted data to be sent to a remote server; and pushing to a local user's browser, 2) a query that provides instructions to the browser-executable library running in the local browser to collect particular types of user data related to user attributes and historical user activities in previous and current sessions of the browser.

Another feature of the methods presented herein may be the shifting the processing of cookie-based data collection and subsequent content distribution at remote servers to a client's browser. Prioritized decision tree graph queries are pushed to user's browsers within browser-executable libraries that when executed, extract user data specifically related to the matching queries from the transmitted prioritized decision tree graph queries.

User data processed by the browser-executable library running the user's browser may also provide derived data associated with particular categories of predefined user behavior, for example, customers who like motorcycles, customers who like red shoes, etc.

Figure 3:
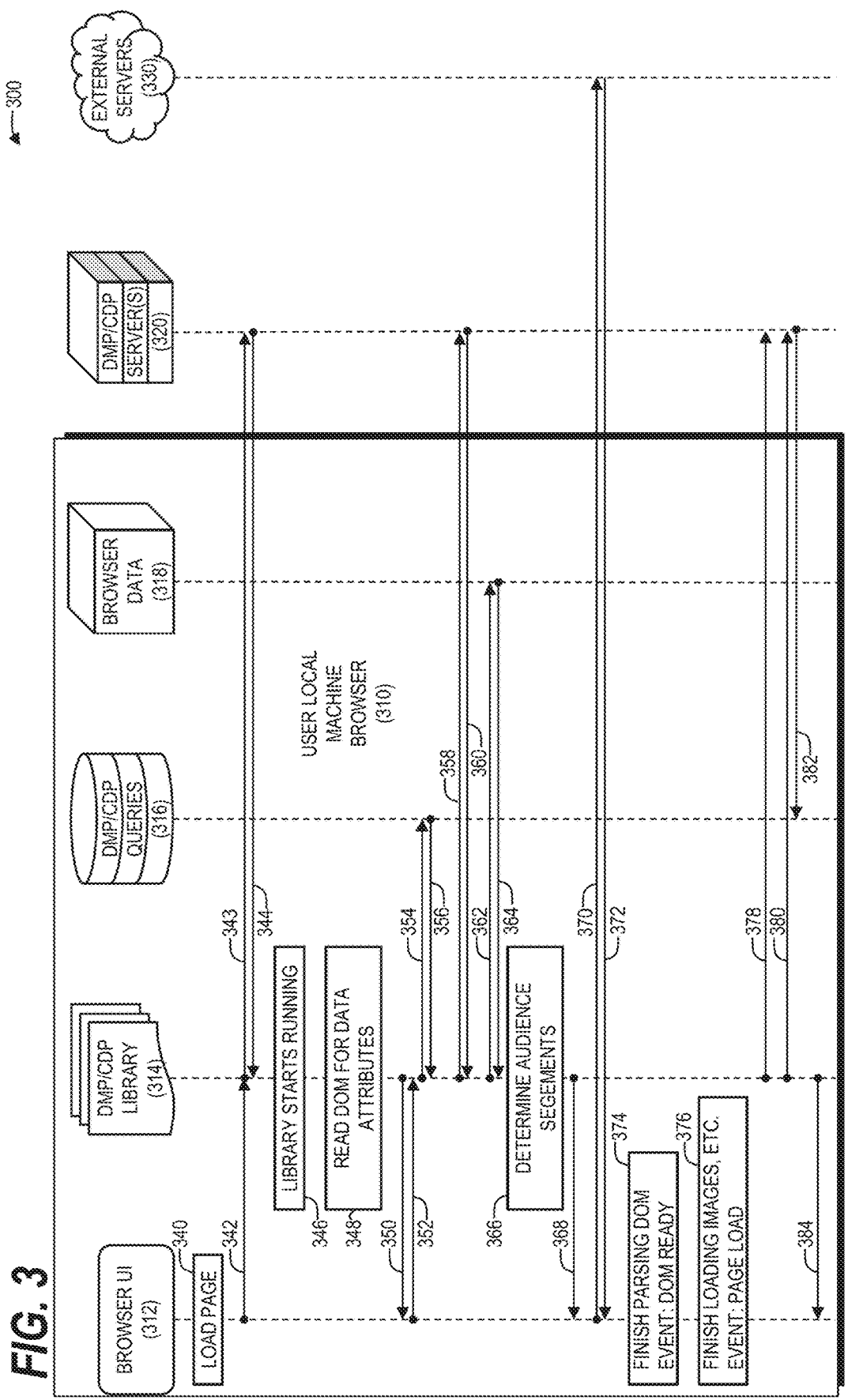
FIG. 3 illustrates workflow diagram that enables user-specific targeting content to be delivered to user browsers without using cookies according to an implementation of the disclosed subject matter.

FIG. 3 illustrates workflow diagram 300 of the methods presented herein. A local machine browser 310 executing on a user's local computer may include a browser User Interface (UI) 312, an DMP/CDP library 314 for retrieving and executing browser-executable library containing prioritized decision tree graph queries, an DMP/CDP query repository 316 for receiving and storing the prioritized decision tree graph queries, and user-specific browser data 318 stored in relation to a user's historical and current browser sessions. The workflow diagram 300 further includes a remote DMP/CDP server(s) 320, (similar to DMP/CDP system 240 of FIG. 2), that provides the prioritized decision tree query in the browser-executable library to the user local machine browser 310, and includes an external content server 330 that may receive a request for and dispense external content to the user location machine browser 310.

The workflow diagram 300 may begin with a user on navigating within the browser UI 312 of the user local machine browser 310 to a particular Uniform Resource Locator (URL) to begin loading 340 a webpage associated with the URL into the browser UI 312.

The browser UI 312 queries the DMP/CDP library 314 to retrieve an execution code library specific to the URL requested by the browser UI 312. If the execution code library exists in the library 314, the execution code library begins running 346 with the hyper-text markup language (HTML) of the requested URL. If the execution code library specific to the URL does not exist at the library 314, the execution code library may alternatively be requested 343 by the library 314 to the DMP/CDP server(s) 320 and accordingly returned 344 to the library 314 to begin running 346 with the HTML of the URL.

Under control of the execution code library, the DMP/CDP library 314 then reads 348 the Document Object Model (DOM) of the returned from the URL to determine how to parse data attributes of the HTML data returned from the URL, and performs a privacy check 350 with the browser UI 312. If the privacy check determines a "don't track" attribute is present, the attribute is presented 352 to the library 314 which then may restrict certain data tracking functions.

Under control of the execution code library, the DMP/CDP library 314 further requests 354 a prioritized decision tree query to be transmitted 356 from the DMP/CDP queries repository 316 in the user local machine browser 310 back to the library 314. However, if an appropriate prioritized decision tree query is not found at the query repository 316, the library 314 may request 358 another prioritized decision tree query to be transmitted 360 from the remote DMP/CDP server(s) 320 back to the library 314 at the user local machine browser 310.

The queries returned to the DMP/CDP library 314 may be matched against user attribute data to produce a prioritized set of queries based on the user attribute data. An example query may include, for example, but not limited to, a user who is interested in sports, a user who has seen a particular media content, or a user who has navigated to a particular website.

Under control of the execution code library, the DMP/CDP library 314 further utilizes a user local machine browser 310 Application Programming Interface (API) to establish a privacy sandbox to apply 362 the queries retrieved from the query repository 316 or the remote server 320 against user-specific browser data stored in a browser date repository 318 indicating historical data of the user's interaction with the user local machine browser 310 through the browser UI 312.

A browser "privacy" sandbox introduces a set of privacy-preserving APIs to accomplish tasks that are typically used in tracking user data. These security APIs enable the user's browser to act on the user's behalf to ensure that data is never shared without their knowledge and consent. The security APIs enable use cases such as ad targeting and conversion measurement, but without revealing individual private and personal information.

User-specific browser data is returned 364 to the library 314 that is associated with all user-specific data matching the applied queries from which audience segments are determined 366 by the executing code library running on the DMP/CDP library 314 of the user local machine browser 310. The audience segment information is added 368 to external tags in the HTML of the requested URL in the browser UI 312

The browser UI 312 then requests 370 content or media content by serving URLs with the audience segment tag information from external server(s) 330 which then returns 372 the requested content or media content to the browser UI 312 of the user location machine browser 310.

The browser UI 312 then finishes 374 parsing the DOM and comes to a "DOM ready" event. Thereafter, the browser UI 312 finishes loading 376 any remaining content of the requested URL and comes to a "Page Load" event after the URL page is fully load in the browser UI 312.

Under control of the execution code library, the DMP/CDP library 314 further transmits 378, to the DMP/CDP server(s) 320, user level identifiers capable of parsing for web-analytics, and URL target dependent data identifying particular websites that have been visited. The library 314 further transmits 380, to the server(s) 320, a request to return 382 updated queries to the query repository 316 at the user local machine browser 310.

Under control of the execution code library, the DMP/CDP library 314, further transmits 384 any data stored in the browser to the browser UI, that may include, a user ID, a number of visits to a URL, a last visit to a URL, an audience segment of the user, etc.

Figure 4:
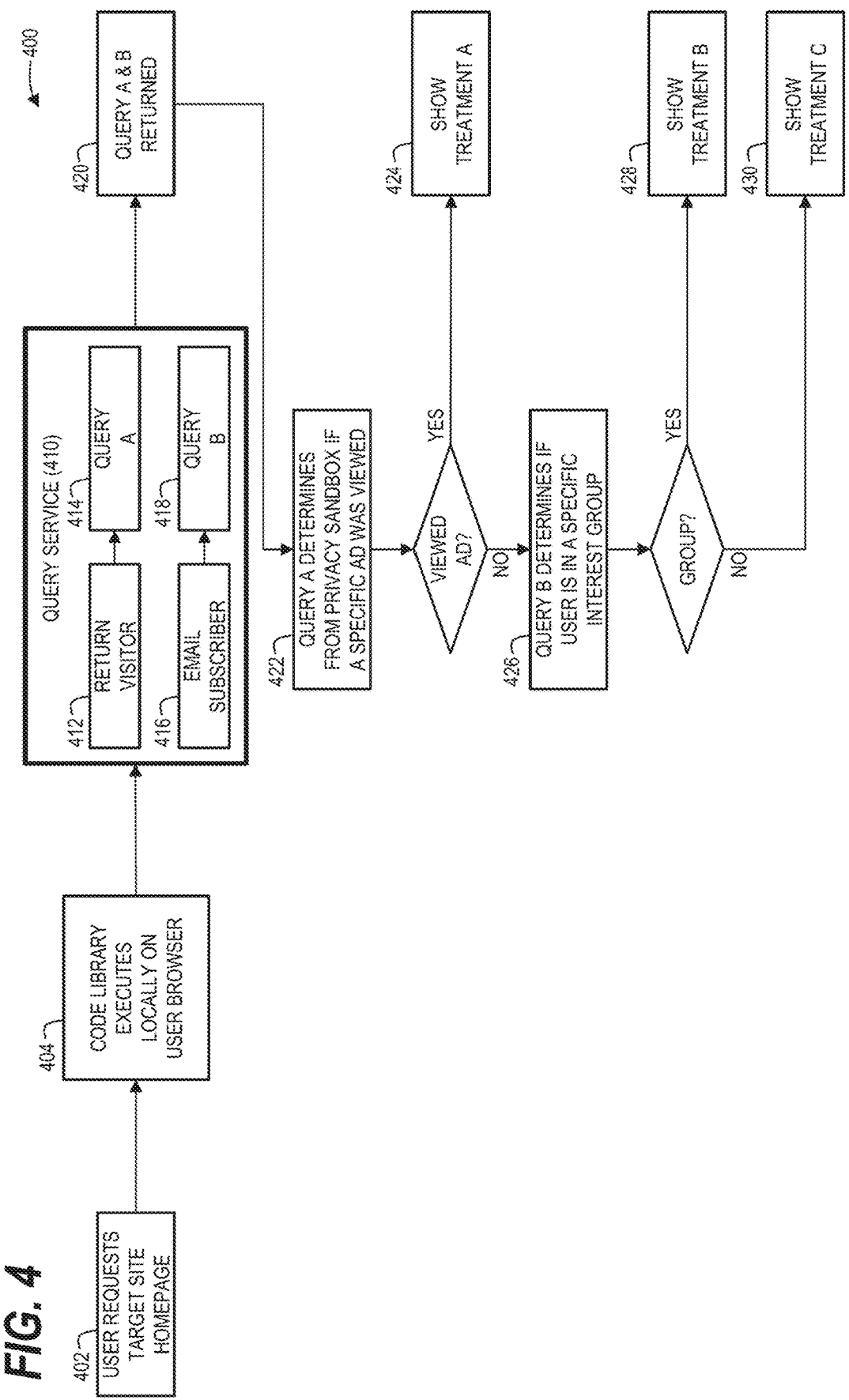
FIG. 4 illustrates a logic diagram of an example of query data flow that enables user-specific targeting content to be delivered to user browsers without using cookies according to an implementation of the disclosed subject matter.

FIG. 4 illustrates a logic diagram of an example of query data flow 400 of another aspect of the methods presented herein.

The query flow diagram begins with a user requesting 402 a target site homepage, for example, by typing the URL "http://foo.com" into a browser. An execution code library specific to the "foo.com" URL requested by the browser is executed 404 at the browser that looks at user-specific data to determine certain user-attributes relevant to queries executed against the user-specific data. The example shows a query service 410 being performed by the execution code library operating at the DMP/CDP library 314, (as shown in FIG. 3), that returns 420 two queries 414 and 418 based on two corresponding user attributes detected in the browser data 318 of the user local machine browser 310. For example, a user attribute of a "return visitor" 412 may correspond to query A 414, and another user attribute of an "email subscriber" 416 may correspond to query B 418.

The flow diagram then proceeds to run query A 414 against user specific data in a privacy sandbox of the browser data 318, (as shown in FIG. 3), to determine 422 if a specific media content was viewed by the user in the browser UI 312. If it is determined that the specific media content was indeed viewed, then the system retrieves for display 424 on the browser UI 312 content corresponding to a personalized media treatment A.

If it is determined that the specific media content was not viewed by the user in the browser UI 312, then flow diagram proceeds to run query B 418 against user specific attributes (for example, an attribute indicating if the user is an email subscriber to a particular interest group), to determine 426 if the user is in a specific interest group. If it is determined that the user is in the specific interest group, then the system retrieves for display 428 on the browser UI 312 content corresponding to a personalized media treatment B. In the alternative, if it is determined that the user is not in the specific interest group, then the system retrieves for display 430 on the browser UI 312 content corresponding to a personalized media treatment C.

Figure 5:
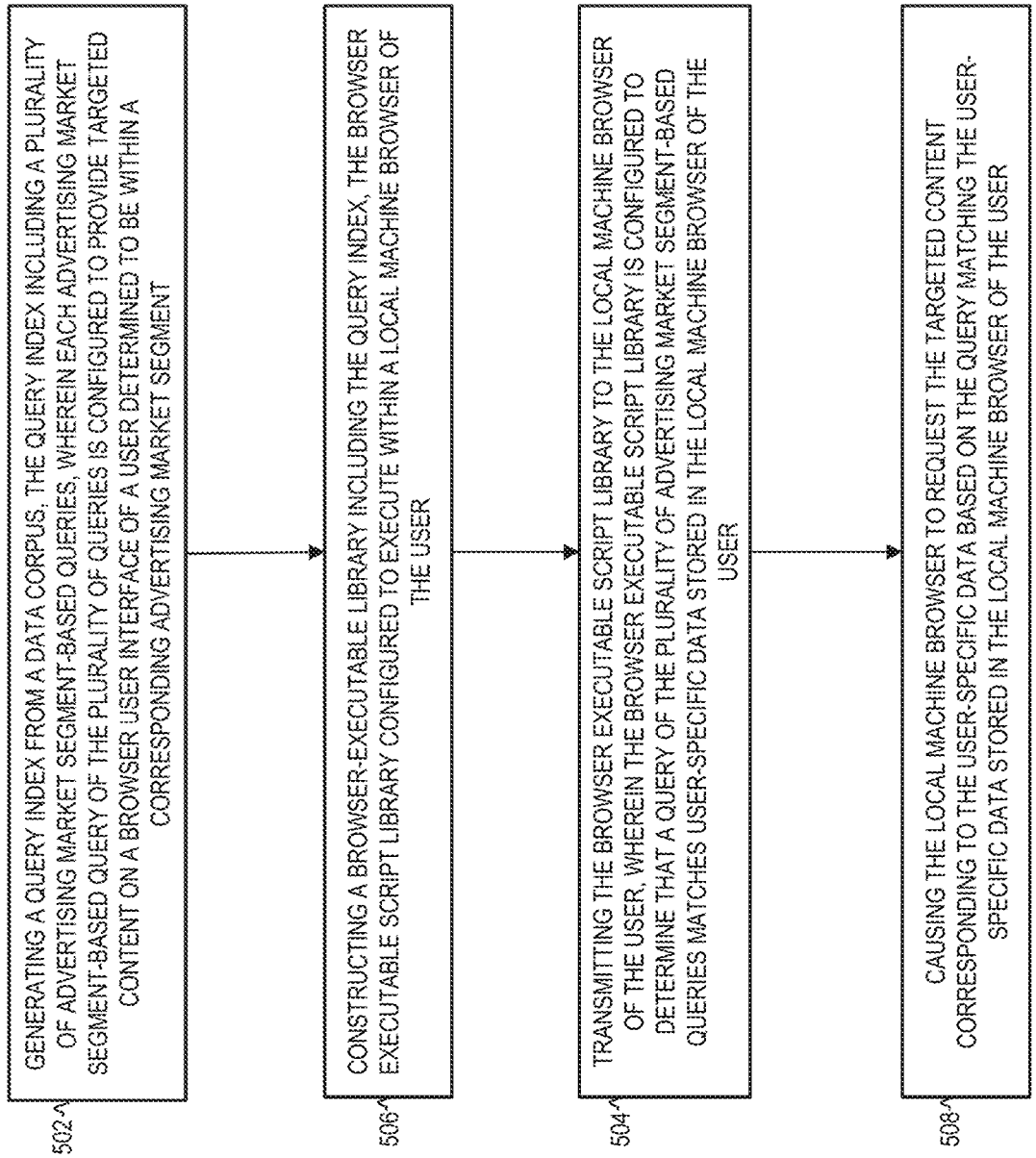
FIG. 5 illustrates a logic flow diagram of a method according to an implementation of the disclosed subject matter.

FIG. 5 illustrates a logic flow diagram of a method 500 disclosed herein. The computer-implemented method includes generating 502 a query index from a data corpus, the query index including a plurality of market segment-based queries, wherein each market segment-based query of the plurality of queries is configured to provide targeted content on a browser user interface of a user determined to be within a corresponding market segment.

The method further includes constructing 504 a browser-executable library including the query index, wherein the browser-executable library is configured to execute within a local machine browser of the user, and then transmitting 506 the browser-executable library to the local machine browser of the user, wherein the browser-executable library is configured to determine that a query of the plurality of market segment-based queries matches user-specific data stored in the local machine browser of the user.

The method further includes causing 508 the local machine browser to request the targeted content corresponding to the user-specific data based on the query matching the user-specific data stored in the local machine browser of the user.

The method further includes the user-specific data stored in the local machine browser including user browser history data stored in a privacy sandbox of a browser data repository, wherein the user browser history data indicates a behavior of the user interacting with the local machine browser.

The method further includes the user-specific data stored in the local machine browser including user-specific attribute data.

The method further includes the requested and received targeted content containing user-specific personalized content.

The method further includes the requested and received targeted content containing user-specific content.

The method further includes replying to a request to transmit an updated query index from the local machine browser.

The method further includes the browser-executable library being configured to cause the local machine browser to locally process at least one query from the query index against locally stored at least one of user attribute data and historical user browser activity, where the at least one query from the query index is configured to provide instructions to the browser-executable library, the instructions being configured to collect at least one of the user attribute data and the historical user browser activity.

The method further includes the query index including a prioritized decision tree graph query index.

The method further includes the browser-executable library being configured to be associated with a particular URL.

A computer-implemented system includes a memory configured to store computer-executable instructions, and a processor configured to retrieve the stored computer-executable instructions and execute the computer-executable instructions on the processor, the computer-executable instructions configured to generate a query index from a data corpus, the query index including a plurality of market segment-based queries, wherein each market segment-based query of the plurality of queries is configured to provide targeted content on a browser user interface of a user determined to be within a corresponding market segment.

The computer-executable instructions being further configured to construct a browser-executable library including the query index, where the browser-executable library is configured to execute within a local machine browser of a user, and transmit the browser-executable library to the local machine browser of the user, wherein the browser-executable library is configured to determine a query of the plurality of market segment-based queries matching user-specific data stored in the local machine browser of the user.

The computer-executable instructions being configured to cause the local machine browser to request and receive content corresponding to the user-specific data of the user based on the query matching the user-specific data stored in the local machine browser of the user.

A browser may include a browser UI configured to enable interaction with the browser by inputting a URL and subsequently display content corresponding to the input URLs.

The browser may further include a browser-executable library execution module configured to receive and execute a browser-executable library containing a prioritized decision tree graph query index including a plurality of market segment-based queries, wherein each market segment-based query of the plurality of queries is configured to provide targeted content on the browser UI when user data is determined to be within a corresponding market segment.

The browser may further include a query repository configured to receive, store and retrieve the prioritized decision tree graph query index and an updated prioritized decision tree graph query index, and a browser data repository configured to store historical session information of user interactions with the browser.

The prioritized decision tree graph query index retrieved from the query repository may be configured to be run in the browser-executable library executing module against the historical session information in the browser data repository, and the browser may be configured to request personalized content from a remote content provider based on a match determined to exist between a query from the prioritized decision tree graph query index and at least a portion of the historical session information, the requested personalized content configured to be displayed in the browser UI.

Figure 6:
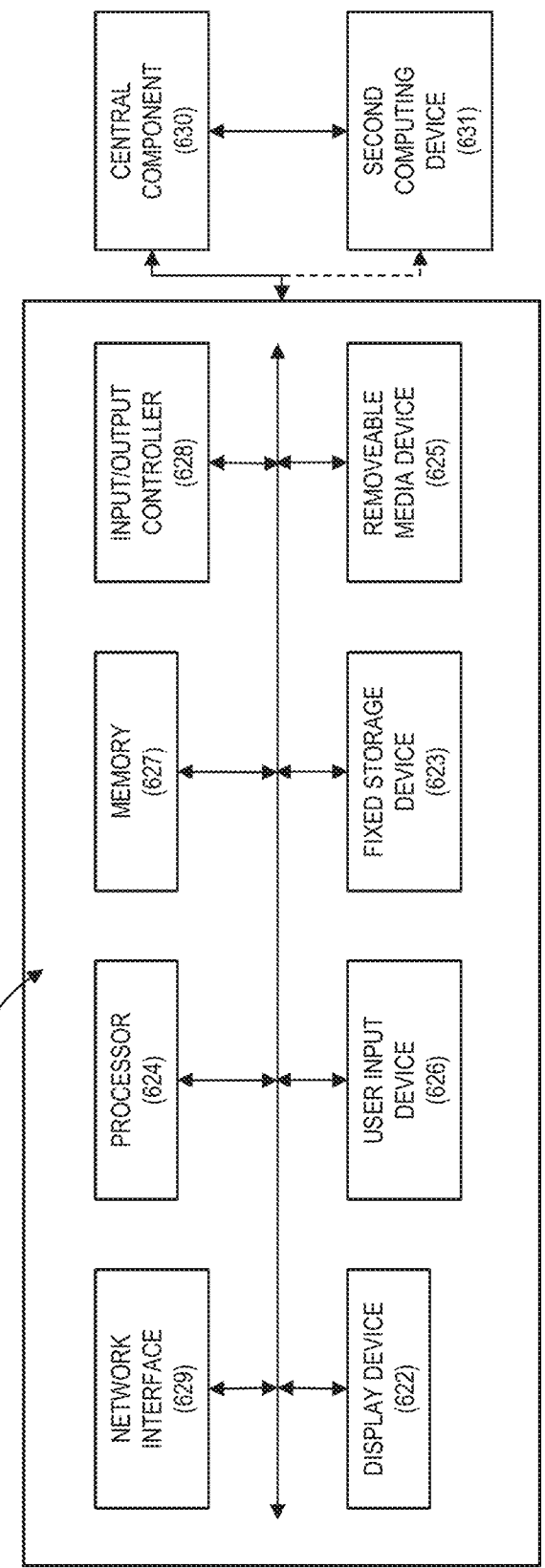
FIG. 6 shows a computer according to an implementation of the disclosed subject matter.

Implementations of the presently disclosed subject matter may be implemented in and used with a variety of component and network architectures. FIG. 6 is an example computer 620 suitable for implementing implementations of the presently disclosed subject matter. As discussed in further detail herein, the computer 620 may be a single computer in a network of multiple computers. As shown in FIG. 6, computer may communicate a central component 630 (e.g., server, cloud server, database, etc.). The central component 630 may communicate with one or more other computers such as the second computer 631. According to this implementation, the information obtained to and/or from a central component 630 may be isolated for each computer such that computer 20 may not share information with computer 631. Alternatively, or in addition, computer 620 may communicate directly with the second computer 631.

The computer (e.g., user computer, enterprise computer, etc.) 620 includes a bus 621 which interconnects major components of the computer 620, such as a central processor 624, a memory 627 (typically RAM, but which may also include ROM, flash RAM, or the like), an input/output controller 628, a user display 622, such as a display or touch screen via a display adapter, a user input interface 626, which may include one or more controllers and associated user input or devices such as a keyboard, mouse, WiFi/cellular radios, touchscreen, microphone/speakers and the like, and may be closely coupled to the I/O controller 628, fixed storage 623, such as a hard drive, flash storage, Fibre Channel network, SAN device, SCSI device, and the like, and a removable media component 625 operative to control and receive an optical disk, flash drive, and the like.

The bus 621 enable data communication between the central processor 24 and the memory 627, which may include read-only memory (ROM) or flash memory (neither shown), and random-access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 620 can be stored on and accessed via a computer readable medium, such as a hard disk drive (e.g., fixed storage 623), an optical drive, floppy disk, or other storage medium 625.

The fixed storage 623 may be integral with the computer 620 or may be separate and accessed through other interfaces. A network interface 629 may provide a direct connection to a remote server via a telephone link, to the Internet via an internet service provider (ISP), or a direct connection to a remote server via a direct network link to the Internet via a POP (point of presence) or other technique. The network interface 629 may provide such connection using wireless techniques, including digital cellular telephone connection, Cellular Digital Packet Data (CDPD) connection, digital satellite data connection or the like. For example, the network interface 629 may enable the computer to communicate with other computers via one or more local, wide-area, or other networks, as shown in FIG. 14.

Many other devices or components (not shown) may be connected in a similar manner (e.g., document scanners, digital cameras and so on). Conversely, all the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 627, fixed storage 623, removable media 625, or on a remote storage location.

Figure 7:
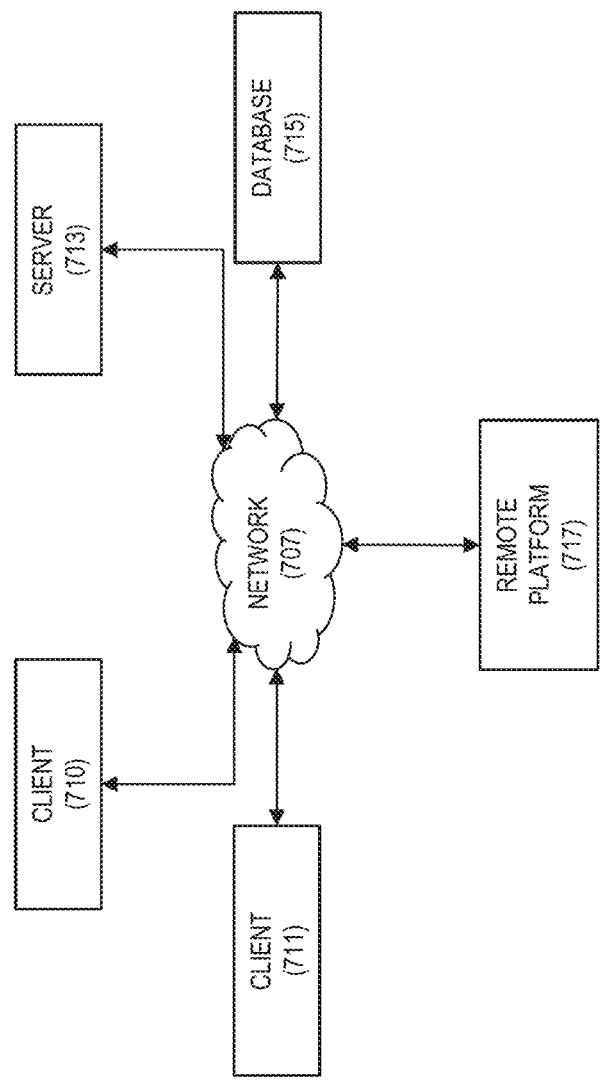
FIG. 7 shows a network configuration according to an implementation of the disclosed subject matter.

FIG. 7 shows an example network arrangement according to an implementation of the disclosed subject matter. One or more clients 710, 711, such as computers, microcomputers, local computers, smart phones, tablet computing devices, enterprise devices, and the like may connect to other devices via one or more networks 707 (e.g., a power distribution network). The network may be a local network, wide-area network, the Internet, or any other suitable communication network or networks, and may be implemented on any suitable platform including wired and/or wireless networks. The clients may communicate with one or more servers 713 and/or databases 715. The devices may be directly accessible by the clients 710, 711, or one or more other devices may provide intermediary access such as where a server 713 provides access to resources stored in a database 715. The clients 710, 711 also may access remote platforms 717 or services provided by remote platforms 717 such as cloud computing arrangements and services. The remote platform 717 may include one or more servers 713 and/or databases 715. Information from or about a first client may be isolated to that client such that, for example, information about client 710 may not be shared with client 711. Alternatively, information from or about a first client may be anonymized prior to being shared with another client. For example, any client identification information about client 710 may be removed from information provided to client 711 that pertains to client 710.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to generate specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
    generating a query index from a data corpus, the query index including a plurality of market segment-based queries, wherein each market segment-based query of the plurality of queries is configured to provide targeted content on a browser user interface of a user determined to be within a corresponding market segment;
    generating a browser-executable library comprising the query index, the browser-executable library configured to execute within a local machine browser of the user; and
    transmitting the browser-executable library to the local machine browser of the user,
    wherein the browser-executable library is configured to determine that a query of the plurality of market segment-based queries matches user-specific data only stored in the local machine browser of the user,
    wherein the query matching the user-specific data stored in the local machine browser of the user is configured to cause the local machine browser to request the targeted content corresponding to the user-specific data.

2. The computer-implemented method of claim 1, wherein the user-specific data stored in the local machine browser comprises user browser history data stored in a privacy sandbox of a browser data repository, wherein the user browser history data indicates a behavior of the user interacting with the local machine browser.

3. The computer-implemented method of claim 1, wherein the user-specific data stored in the local machine browser comprises user-specific attribute data.

4. The computer-implemented method of claim 1, wherein the requested and received targeted content contains user-specific personalized content.

5. The computer-implemented method of claim 1, wherein the requested and received targeted content contains user-specific content.

6. The computer-implemented method of claim 1, further comprising replying to a request to transmit an updated query index from the local machine browser.

7. The computer-implemented method of claim 1, wherein the browser-executable library is configured to cause the local machine browser to locally process at least one query from the query index against locally stored at least one of user attribute data and historical user browser activity.

8. The computer-implemented method of claim 7, wherein the at least one query from the query index is configured to provide instructions to the browser-executable library, the instructions configured to collect at least one of the user attribute data and the historical user browser activity.

9. The computer-implemented method of claim 1, where the query index comprises a prioritized decision tree graph query index.

10. A computer-implemented system comprising:
    a memory configured to store computer-executable instructions; and
    a processor configured to retrieve the stored computer-executable instructions and execute the computer-executable instructions on the processor, the computer-executable instructions configured to:
        generate a query index from a data corpus, the query index including a plurality of market segment-based queries, wherein each market segment-based query of the plurality of queries is configured to provide targeted content on a browser user interface of a user determined to be within a corresponding market segment;
        construct a browser-executable library comprising the query index, the browser-executable library configured to execute within a local machine browser of a user; and
        transmit the browser-executable library to the local machine browser of the user,
    wherein the browser-executable library is configured to determine a query of the plurality of market segment-based queries matching user-specific data only stored in the local machine browser of the user,
    wherein the query matching the user-specific data stored in the local machine browser of the user causes the local machine browser to request and receive content corresponding to the user-specific data of the user.

11. The computer-implemented system of claim 10, wherein the user-specific data stored in the local machine browser comprises user browser history data stored in a privacy sandbox of a browser data repository, wherein the user browser history data indicates a behavior of the user interacting with the local machine browser.

12. The computer-implemented system of claim 10, wherein the user-specific data stored in the local machine browser comprises user-specific attribute data.

13. The computer-implemented system of claim 10, wherein the requested and received targeted content contains user-specific personalized content.

14. The computer-implemented system of claim 10, wherein the requested and received targeted content contains user-specific content.

15. The computer-implemented system of claim 10, further comprising replying to a request to transmit an updated query index from the local machine browser.

16. The computer-implemented system of claim 10, wherein the browser-executable library is configured to cause the local machine browser to locally process at least one query from the query index against locally stored at least one of user attribute data and historical user browser activity.

17. The computer-implemented system of claim 16, wherein the at least one query from the query index is configured to provide instructions to the browser-executable library, the instructions configured to collect at least one of the user attribute data and the historical user browser activity.

18. The computer-implemented system of claim 10, where the query index comprises a prioritized decision tree graph query index.

19. The computer-implemented system of claim 10, wherein the browser executable script library is configured to be associated with a Uniform Resource Locator (URL).

20. The computer-implemented system of claim 10, wherein constructing the browser-executable library comprising the query index further comprises compiling the query index into the browser-executable library.

\* \* \* \* \*